United States Patent [19]

Shiba

[11] Patent Number: 4,588,384
[45] Date of Patent: May 13, 1986

[54] FIXED-STAR PROJECTING MACHINE FOR PLANETARIUM

[75] Inventor: Kenji Shiba, Toyohashi, Japan

[73] Assignee: Minolta Camera Kabushiki Kaisha, Osaka, Japan

[21] Appl. No.: 724,132

[22] Filed: Apr. 17, 1985

[30] Foreign Application Priority Data

Apr. 18, 1984 [JP] Japan ............................ 59-78210

[51] Int. Cl.⁴ .................................................. G09B 27/00
[52] U.S. Cl. .................................................. 434/286
[58] Field of Search .................................. 434/286, 285

[56] References Cited

U.S. PATENT DOCUMENTS

| | | | |
|---|---|---|---|
| 1,616,736 | 2/1927 | Bauersfeld | 434/286 |
| 1,693,969 | 12/1928 | Villiger et al. | 434/286 |
| 2,483,216 | 9/1949 | Marshall | 434/286 |
| 3,571,954 | 5/1966 | Frank | 434/286 |
| 3,863,363 | 2/1975 | Miyajima | 434/286 |
| 4,403,964 | 9/1983 | Meier | 434/286 |

Primary Examiner—William H. Grieb
Attorney, Agent, or Firm—Wolder, Gross & Yavner

[57] ABSTRACT

A fixed-star projecting machine for a planetarium includes a fixed-star projection lens unit in each polygon of the globe surface of a fixed-star projection globe divided into a plurality of parts. Of these projection lens units, one whose projection range covers both sides of the equator is adapted to have its optical axis shifted in the direction which increases the attaching angle. The star positions of the fixed-star negative of the shifted projection lens unit are corrected to the normal projection positions according to the amount of shift.

5 Claims, 8 Drawing Figures

FIXED-STAR PROJECTING MACHINE FOR PLANETARIUM

BACKGROUND OF THE INVENTION

1. Technical Field

This invention relates to a fixed-star projecting machine for a planetarium which uses a small-diametered projection globe to make it possible to project not only stars with improved image formation but also constellations, marks and constellation pictures.

2. Prior Art

The conventional planetarium apparatus disclosed in U.S. Pat. No. 3,571,954 projects fixed stars by using a combination of single-sleeve type projectors for projecting stars of the first and brighter magnitudes embedded in a globe and a pin hole type projector with many apertures formed on the surface of the globe for projecting other stars.

With this projecting method, however, to improve the images of stars projected by the pin hole type projector, not only is it necessary to enlarge the globe, but also there is a limit to the number of lens type projectors that can be attached to the globe surface and to the number of auxiliary parts such as electrically conductive springs for feeding power to lamps for said projectors. Further, if the globe is reduced in diameter, the images of stars projected by the pin hole type projector will be inferior in image formation to the images of brighter stars projected by the single-sleeve type projectors. Thus, only a very disharmonius pattern of images of stars projected could be formed on the whole heaven, and there is almost no space available for installing the single-sleeve type projectors and their accessories so that the bright stars must be projected by the pin hole type projectors which are inferior in image formation to single-sleeve type projector.

SUMMARY OF THE INVENTION

This invention is intended to eliminate the drawback described above. An object of the invention is to provide a fixed-star projecting machine for a planetarium wherein the projection of stars is effected by a lens type projector with improved image formation and a portion of the projected image is not obstructed by auxiliary parts such as electrically conductive slip rings disposed on a great circle of the globe.

This invention is a planetarium wherein a fixed-star projection globe having auxiliary parts disposed along one great circle of the globe is rotated by the rotary motions about a rotary axis extending at right angles to said great circle to project the fixed stars in the whole heaven, characterized in that the globe surface of the fixed-star projection globe is divided into a plurality of regions, in each of which a projection lens unit is provided. Each of the lens unit includes a condenser lens, a fixed-star negative having stars in a star region corresponding to the region, and a projection lens is disposed on the same radial line with respect to a light source disposed at the center of the fixed-star projection globe, those projection ranges extending across the great circle of said globe are so arranged that the optical axes of the projection lenses are disposed at positions shifted from the centers of the respective regions toward the rotary axis, the other units being so arranged that the optical axes of the projection lenses coincide with the respective centers of their regions, the star positions of the fixed-star negatives of the projection lens units whose optical axes are shifted being corrected according to the amount of shift of the optical axis so that they come to the normal projection positions.

DESCRIPTION OF THE PREFERRED EMBODIMENTS

Figure 1:
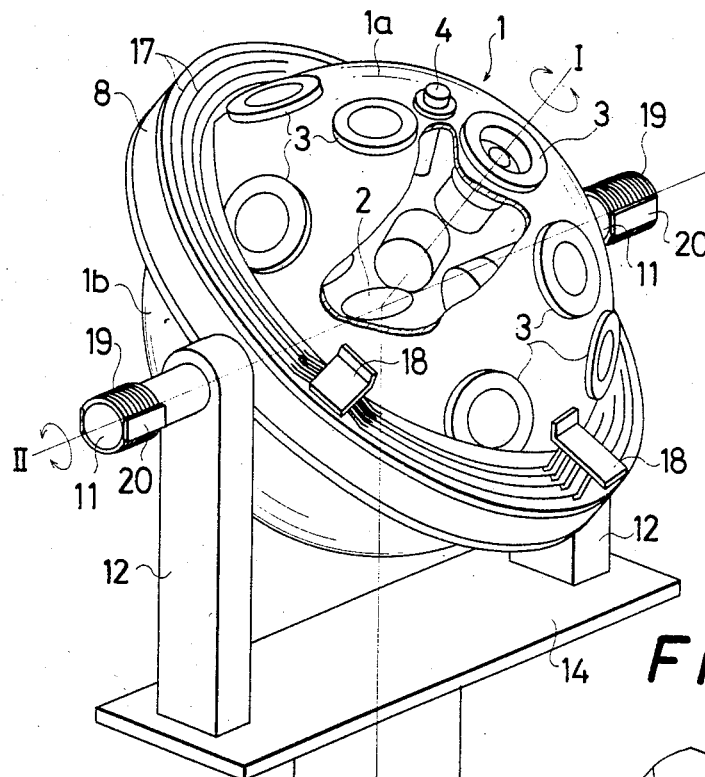
FIG. 1 is a perspective view of an embodiment of the invention, partly cut away.
Figure 6:
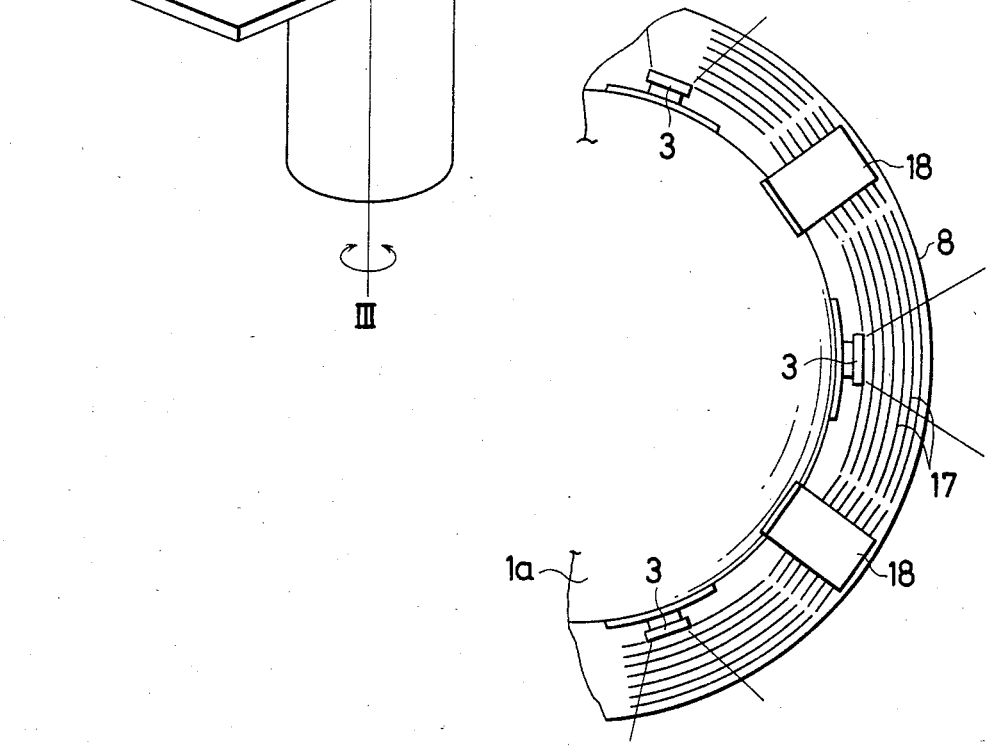
FIG. 6 is a fragmentary plan view of the fixed-star projection globe.
Figure 2:
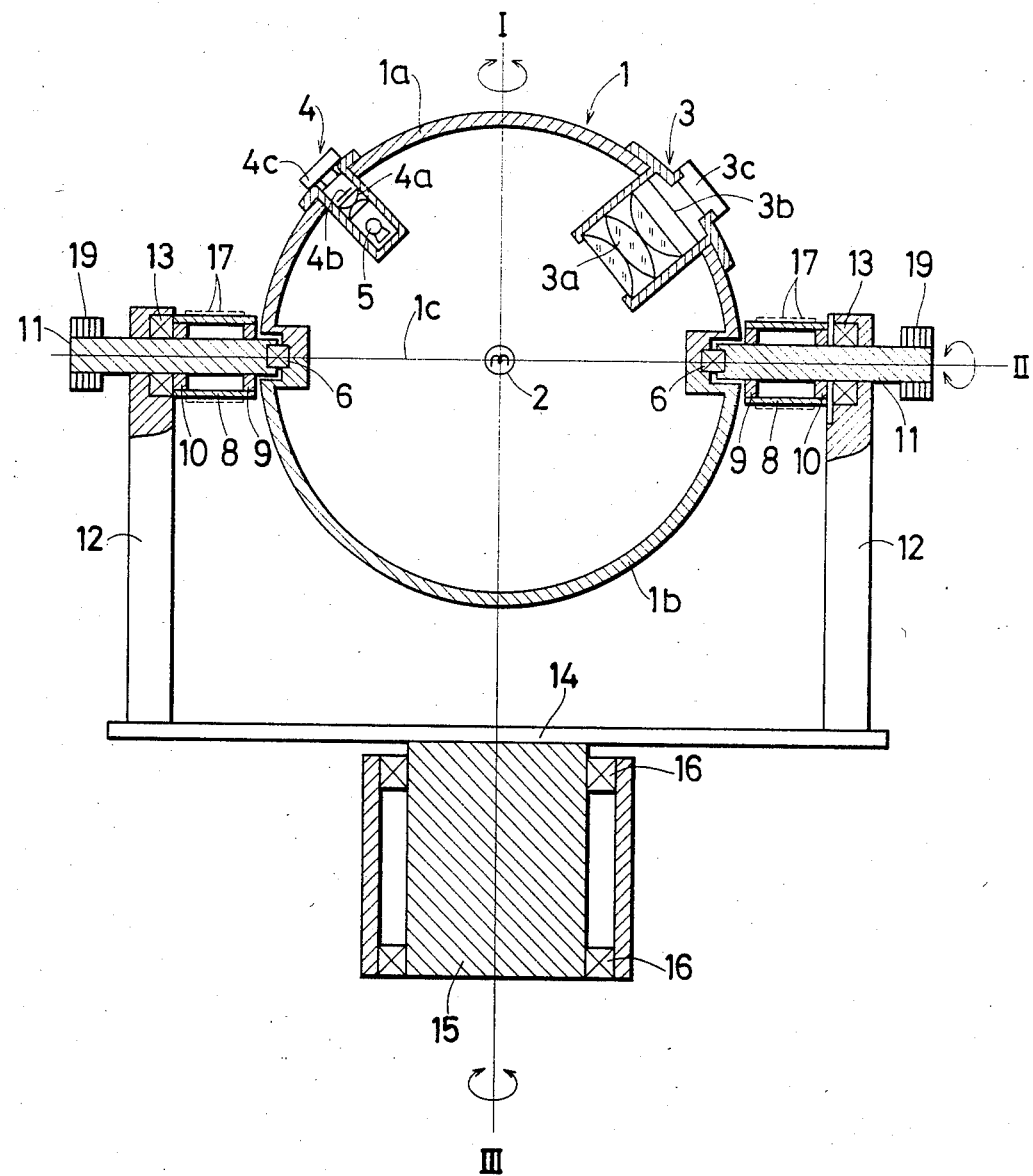
FIG. 2 is a vertical sectional view.

In FIGS. 1 and 2, a fixed-star projection globe 1 is formed of two globe halves 1a and 1b divided along a great circle 1c. It can be rotationally driven about a first rotary axis I perpendicular to the great circle 1c, a second rotary axis II horizontally extending through the center of the great circle 1c, and a third rotary axis III vertically extending through the intersection between the first and second rotary axes I and II.

The globe surface of the fixed-star projection globe 1 is provided with a required number of projection lens units 3 adapted to project the fixed stars in the whole-heaven using a single fixed star projection light source 2 housed in the center of the globe. Installed in the space between these units 3 are a plurality of auxiliary projection units 4 for projecting constellations, marks and constellation pictures using their individual light sources 5.

Each projection lens unit 3 comprises condenser lenses 3a, fixed-star negative 3b, and projection lens 3c and projects the fixed stars in one of the angular ranges into which the whole heaven is divided. In the case of the lens projection type, from the standpoint of optical performance and the size and projection efficiency of the fixed-star projection globe 1, the whole heaven is divided into 32 parts by regular pentagons and irregular hexagons whose circumscribed circles are same size so that the respective projection ranges of the projection lens units 3 are the same (the projection angle with respect to the center is 22°41'). For a better understanding of this, FIG. 3 shows a plan view in which the dividing surface of the fixed-star projection globe 1 is taken as the equator and a half of the celestial sphere is divided into sixteen parts; however, it is not absolutely necessary to take the dividing surface as the equator provided that a regular pentagon is located at the zenith and that the corresponding coordinate transformation is effected.

The globe halves 1a and 1b are provided at their coupling portions with a bearing 6 for rotating the fixed-star projection globe 1 about the first rotary axis I. The fixed-star projection globe 1 is rotated about the first rotary axis I by an unillustrated gear meshing with a gear 7 (see FIG. 4) which is installed around the outer periphery of either of globe halves 1a and 1b. The fixed-star projection globe 1 is held by an annular holder 8 formed of an inner ring 9 and an outer ring 10 and an unillustrated rib connecting the rings 9, 10 through the bearing 6. Further, the annular holder 8 is supported along the second rotary axis II, by horizontal shafts 11 which are provided with the bearing 6 at one of their respective ends and are rotatably supported by bearings 13 in support members 12 erected on a base plate 14. Thus, the fixed-star projection globe 1 is rotated about the second rotary axis II. The base plate 14 has a vertical shaft 15 rotatably supported in a bearing 16 to rotate the fixed-star projection globe 1 around the third rotary axis III.

Each auxiliary projection unit 4 comprises a condenser lens 4a, projection negative 4b and projection lens 4c. Supply of power to the light sources 5 is effected through a required number of slip rings 17 disposed around the axis I on the upper surface of the annular holder 8, and then through brushes 18 fixed to the fixed-star projection globe 1 in contact with said slip rings 17, a required number of slip rings 19 disposed on the surfaces of the horizontal shafts 11, and brushes 20 in contact with said slip rings 19. The annular holder 8 has a drive mechanism (not shown) for driving the gear 7 (see FIG. 4) and position detecting means (not shown) installed in an inner space 21, and is provided with a cover 22 (see FIG. 4) over said slip rings 17.

Figure 3:
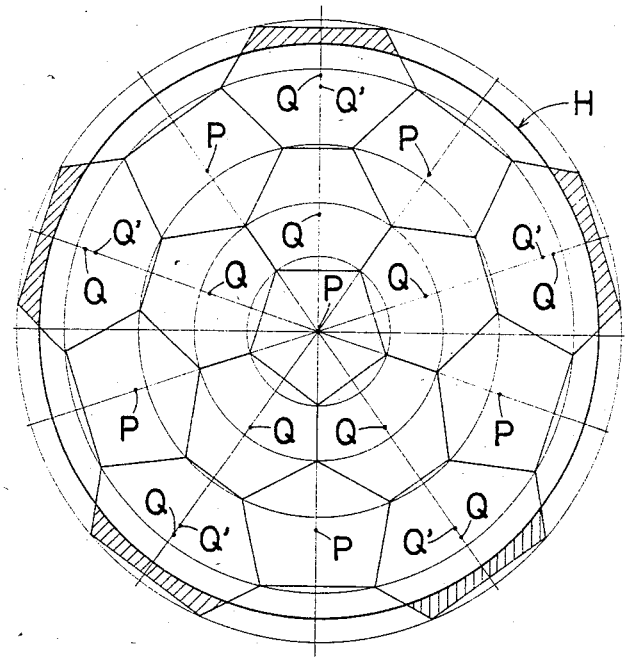
FIG. 3 is a plan view showing an example in which the projection range for each globe half is divided into 16 parts.

In FIG. 3 in which a half of the celestial sphere is divided into sixteen regions by regular pentagons and irregular haxagons, and each divided region has the above described projection lens unit 3. In order for five irregular hexagons provided adjacent the equator H to extend their projection ranges across the equator (with a declination of 0 degree) H to the other hemisphere (the hatched areas indicate projection portions to the other hemisphere), each projection lens unit 3 is disposed at a position Q' which is shifted from a center of a circumscribed circle of the hexagon Q toward the first rotary axis I. More concretely, the declination of the center Q is +10°49 whereas the declination of the shifted position Q' is greater than that of the center Q, e.g., +12°49. At this shifted position, a luminous flux 23 from the lens unit 3 advances to the other hemisphere, i.e, to the southern heaven without being obstructed by the cover 22 of the annular holder 8 and other obstructing elements (see FIG. 4).

On the other hand, the position lens units 3 provided in said divided regions excluding said five irregular hexagons are positioned at the centers P, Q of the circumscribed circle of them.

Figure 5:
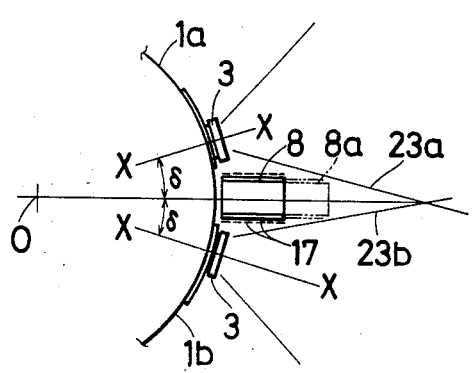
FIG. 5 is a fragmentary front view where the projection range covers both sides of the equator.

Said projection lens units 3 provided in the respective region are so arranged that a line connecting a center O of the fixed-star projection globe 1 to P or Q or Q' coincides with the optical axis X—X of the lens units 3 (see FIG. 5).

And the fixed-star negatives 3b of the projection units 3 are so arranged that projected images of the fixed stars come to the proper positions of themselves in a star field.

Thus, the fixed-star projection globe 1 having thirty-two projection lens units 3 project the fixed stars in the whole celestial sphere without being obstructed by the auxiliary parts disposed along one great circle of the globe 1.

Figure 4:
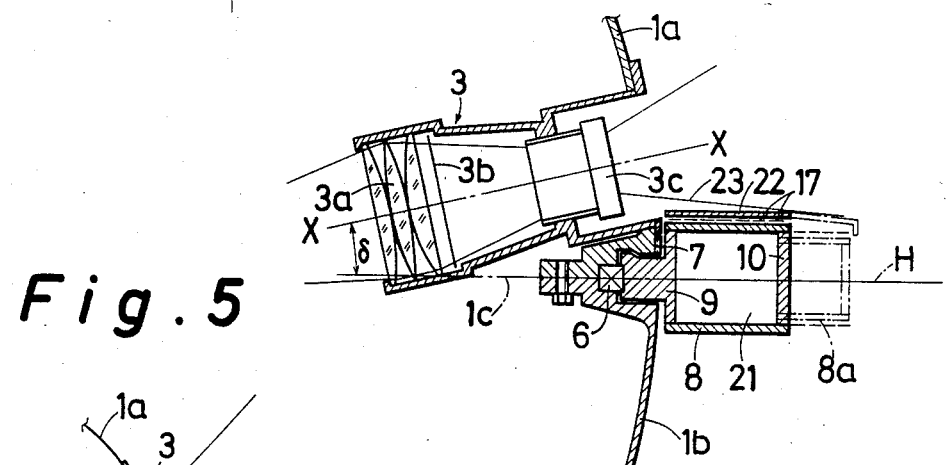
FIG. 4 is a principal sectional view showing the details of the junction of fixed-star projection globe.

In addition, if the auxiliary projection units 4 attached to the fixed-star projection globe 1 or the slip rings 17 disposed on the annular holder 8 are required to be increased in number, it is advisable that a second annular holder 8a of less thickness be provided outside the annular holder 8 to increase the outer diameter and that electrically conductive slip rings 19 be disposed on the surface thereof (see FIGS. 4 and 5).

Figure 7:
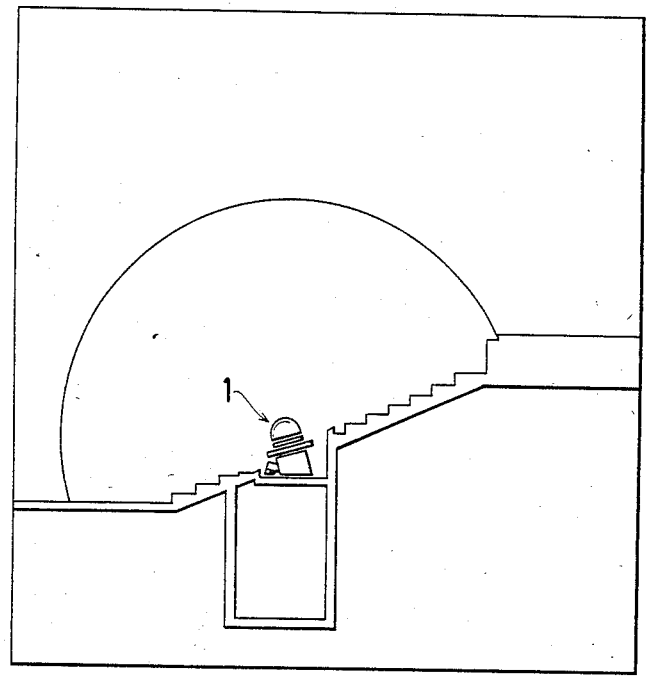
FIG. 7 is a sectional view of the entire planetarium.
Figure 8:
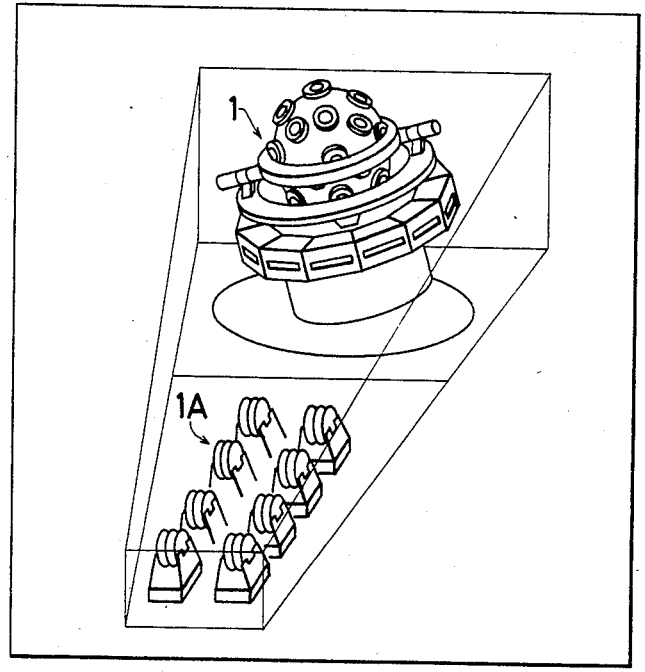
FIG. 8 is a perspective view of a fixed-star projecting machine showing the relation to a planet projecting machine.

If the apparatus of the aforesaid arrangement, together with a planet projecting machine 1A arranged as shown in FIG. 8, is positioned at the center of a dome (see FIG. 7), the diurnal motion and latitude variation of fixed stars as seen on the earth can be reproduced by rotary motions about the axes I and II, respectively, while the diurnal motion of fixed stars as seen on a planet and the precession of the earth can be reproduced by rotary motions about the axes I, II and III.

In the present invention, each polygon by which the globe surface of the fixed-star projection globe 1 is divided has only one projection lens unit; thus, as compared with the case of using a conventional pin hole type fixed-star projection globe, a large number of spaces for attaching the auxiliary projection units 4 can be secured. For example, if the projection lens units 3 of the invention are installed in a fixed-star projection globe 1 whose outer diameter is 1 m, then 100 or more auxiliary projection lens units 4 can be attached.

This invention relates to a planetarium for projecting the fixed stars in the whole heaven by the rotary motions of the globe around the rotary axis, wherein each of the polygonal surface of the fixed-star projection globe divided into a plurality of parts is provided with a projection lens unit respectively. Each of the projection lens units includes the condenser lens, fixed-star negative and projection lens, and those covering both sides of the great circle have their optical axes shifted in the direction which increases the attaching angle, and the star positions in the fixed-star negatives of the shifted projection lens units are adjusted according to the amount of shift so that they come to the normal projection positions. Thus, according to the present invention, fixed stars which had been incapable of projecting because of the provision of auxiliary projection units for projecting constellations, marks and constellation pictures in a conventional fixed-star projecting machine can now be projected with improved image formation. Further, the present invention can also eliminate the inconvenience of having to provide separate projection units at positions away from the equator in the case of projecting important stars in the vicinity of the equator by the conventional planetarium having pin hole type projector.

What is claimed is:

1. A fixed-star projecting machine for a planetarium comprising;
    a fixed-star projection globe having auxiliary parts disposed along one great circle of the globe and rotatable about a rotary axis extending at right angle to said great circle,
    a plurality of regions by which a surface of said fixed-star projection globe is divided,
    first projecting means disposed in some of said divided regions extending across said great circle and projecting the fixed stars in a star region corresponding to the respective divided regions where the first projecting means are disposed, optical axes of the first projecting means being shifted from each center of their respectively divided regions toward said rotary axis, second projecting means disposed in other part of said divided regions for projecting the fixed stars in a star region corresponding to the respective regions where the second projecting means are disposed, optical axes of the second projecting means coinciding with each center of their respectively divided regions.

2. A fixed-star projecting machine for a planetarium, comprising;

a fixed-star projection globe rotatably provided about a rotary axis extending at right angle to a great circle thereof said fixed-star projection globe having a plurality of slip rings for power feeding, a plurality of polygonal regions by which a surface of said fixed-star projection globe is divided, first projecting means disposed in some of said polygonal regions extending across said great circle and projecting the fixed stars in a star region corresponding to the respective polygonal regions where the first projecting means are disposed, optical axes of the first projecting means being shifted from each center of a circumscribed circle of the respective polygonal region toward said rotary axis, second projecting means disposed in other of said polygonal regions for projecting the fixed stars in a star region corresponding to the respective polygonal regions where the second projecting means are disposed, optical axes of the second projecting means coinciding with center of the circumscribed circle of the respective polygonal regions.

3. A fixed-star projecting machine for a planetarium as claimed in claim 2, wherein said first projecting means comprises a projection lens, a condenser lens, and a fixed-star negative having stars in a star region corresponding to the polygonal region where said first projecting means are disposed.

4. A fixed-star projecting machine for a planetarium as claimed in claim 3, wherein the optical axes of said first projecting means extend to a light source disposed at the center of the fixed-star projection globe.

5. A fixed-star projecting machine for a planetarium as claimed in claim 2, wherein said second projecting means comprises a projection lens, a condenser lens and fixed-star negative having stars in a star region corresponding to the polygonal region where said second projecting means are disposed.

* * * * *